United States Patent
Adams et al.

(10) Patent No.: US 10,399,600 B2
(45) Date of Patent: Sep. 3, 2019

(54) DIAGNOSTIC METHOD FOR AN ACTUATOR IN AN AUTONOMOUS VEHICLE

(71) Applicant: GM GLOBAL TECHNOLOGY OPERATIONS LLC, Detroit, MI (US)

(72) Inventors: Matthew G. Adams, Oshawa (CA); Dean C. Degazio, Birmingham, MI (US); Kelvin Chen Chih Peng, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 42 days.

(21) Appl. No.: 15/592,756

(22) Filed: May 11, 2017

(65) Prior Publication Data

US 2018/0329419 A1    Nov. 15, 2018

(51) Int. Cl.
*G05D 1/02* (2006.01)
*G05D 1/00* (2006.01)
*G07C 5/02* (2006.01)
*B62D 15/02* (2006.01)

(52) U.S. Cl.
CPC ......... *B62D 15/025* (2013.01); *G05D 1/0088* (2013.01); *G05D 1/0212* (2013.01); *G07C 5/02* (2013.01)

(58) Field of Classification Search
CPC ...... G05D 1/0212; G05D 1/0088; G07C 5/02; B62D 15/025
See application file for complete search history.

(56) References Cited

U.S. PATENT DOCUMENTS

| 9,446,792 B2* | 9/2016 | Takeda ................ B62D 6/008 |
| 2005/0216161 A1* | 9/2005 | Sakugawa ........... B60T 8/1755 701/70 |
| 2010/0082195 A1* | 4/2010 | Lee ..................... B62D 15/025 701/25 |

* cited by examiner

*Primary Examiner* — Nga X Nguyen

(57) ABSTRACT

A method of controlling a vehicle having an automated driving system configured to control vehicle steering includes determining a commanded vehicle path. The method additionally includes calculating a steering command to satisfy the commanded vehicle path. The method also includes controlling vehicle steering, via the automated driving system, according to the steering command. The method further controls detecting a difference between an actual vehicle path and the commanded vehicle path, and, in response to the detected difference, controlling the vehicle according to a secondary mode.

8 Claims, 3 Drawing Sheets

DIAGNOSTIC METHOD FOR AN ACTUATOR IN AN AUTONOMOUS VEHICLE

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

A method according to the present disclosure for controlling a vehicle having an automated driving system configured to control vehicle steering includes determining a commanded vehicle path. The method additionally includes calculating a steering command to satisfy the commanded vehicle path. The method also includes controlling vehicle steering, via the automated driving system, according to the steering command. The method further controls detecting a difference between an actual vehicle path and the commanded vehicle path, and, in response to the detected difference, controlling the vehicle according to a backup steering mode.

In an exemplary embodiment, controlling the vehicle according to the diagnostic mode is in further response to a current road wheel angle being below a calculated road wheel angle threshold.

In an exemplary embodiment, controlling the vehicle according to the diagnostic mode is in further response to a current actuator command exceeding a calculated actuator command threshold to maintain a target path.

In an exemplary embodiment, controlling the vehicle according to the diagnostic mode is in further response to a determination that no external torque influence affects vehicle steering.

In an exemplary embodiment, the diagnostic mode includes a secondary steering mode.

In an exemplary embodiment, the diagnostic mode includes providing an operator notification.

A vehicle according to the present disclosure includes an actuator and at least one controller. The actuator is configured to control vehicle steering. The controller is programmed to control the actuator according to an automated driving system. The controller is programmed to determine a target path, calculate an actuator setting to satisfy the target path, control the actuator according to the actuator setting, and detect a difference between an actual vehicle path and the target path. In response to the detected difference, the controller controls the actuator according to a diagnostic mode.

In an exemplary embodiment, the controller is configured to control the actuator according to the diagnostic mode in further response to a current road wheel angle being below a calculated road wheel angle threshold.

In an exemplary embodiment, the controller is configured to control the actuator according to the diagnostic mode in further response to a current actuator command exceeding a calculated actuator command threshold to maintain a target path.

In an exemplary embodiment, the controller is configured to control the actuator according to the diagnostic mode in further response to a determination that no external torque influence affects vehicle steering.

In an exemplary embodiment, controlling the vehicle according to the diagnostic mode is in further response to a determination that no external torque influence affects vehicle steering.

In an exemplary embodiment, the diagnostic mode includes a secondary steering mode.

In an exemplary embodiment, the diagnostic mode includes providing an operator notification.

Embodiments according to the present disclosure provide a number of advantages. For example, the present disclosure provides a system and method for detecting a diagnostic condition associated with an actuator and taking appropriate diagnostic action. Moreover, systems and methods according to the present disclosure do so via a software-based solution, independent of any signals received from the actuator.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
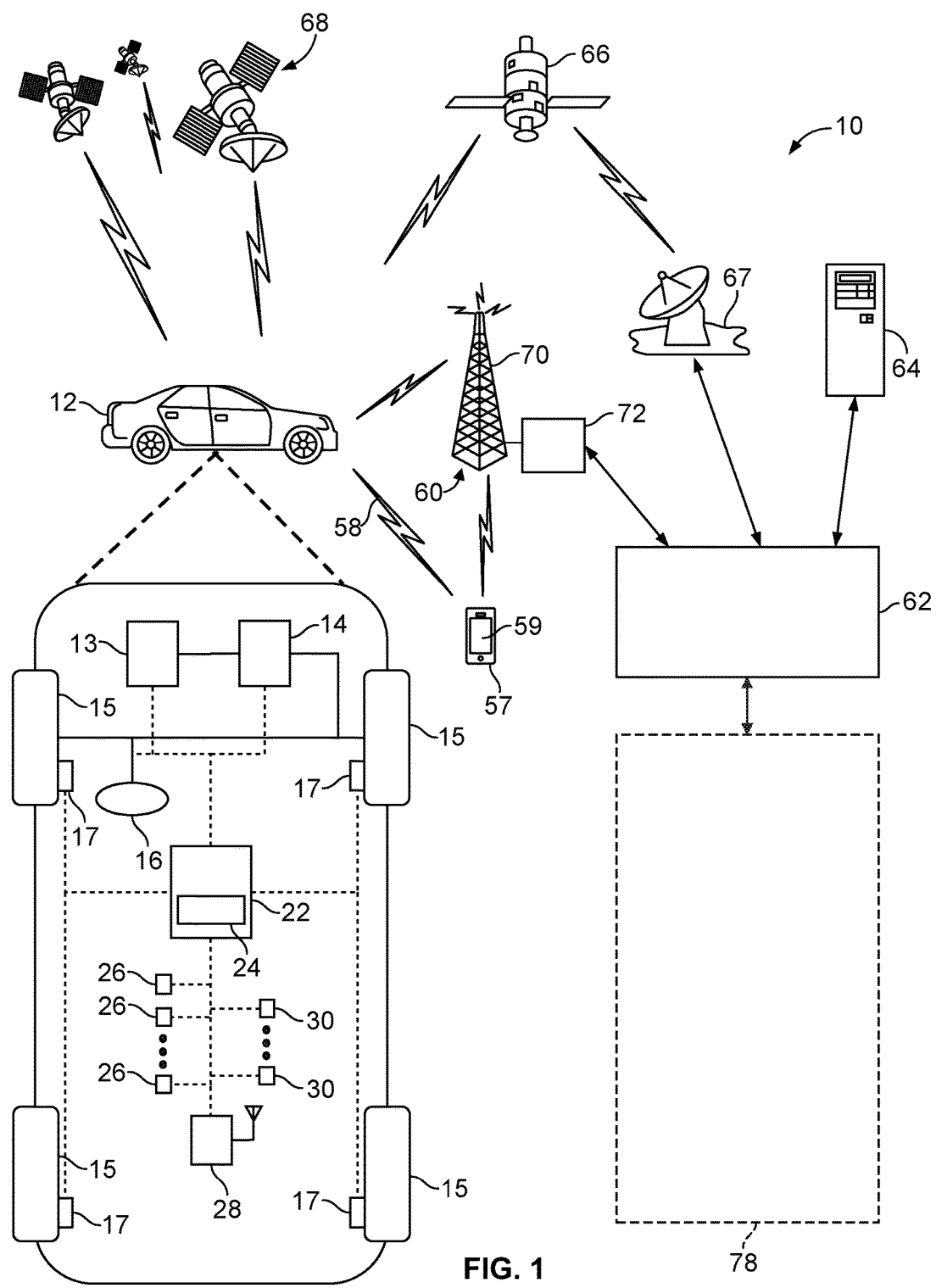
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, aspects of the present disclosure may be embodied in a so-called Level Two or Level Three automation system. A Level Two system indicates "partial automation", referring to the driving-mode specific execution by one or more driver assistance systems of both steering and acceleration/deceleration with the expectation that the human driver perform all remaining aspects of the dynamic driving task. A Level Three system indicates "conditional automation", referring to the driving mode-specific performance by an automated driving system of all aspects of the dynamic driving task with the expectation that the human driver will respond appropriately to a request to intervene.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
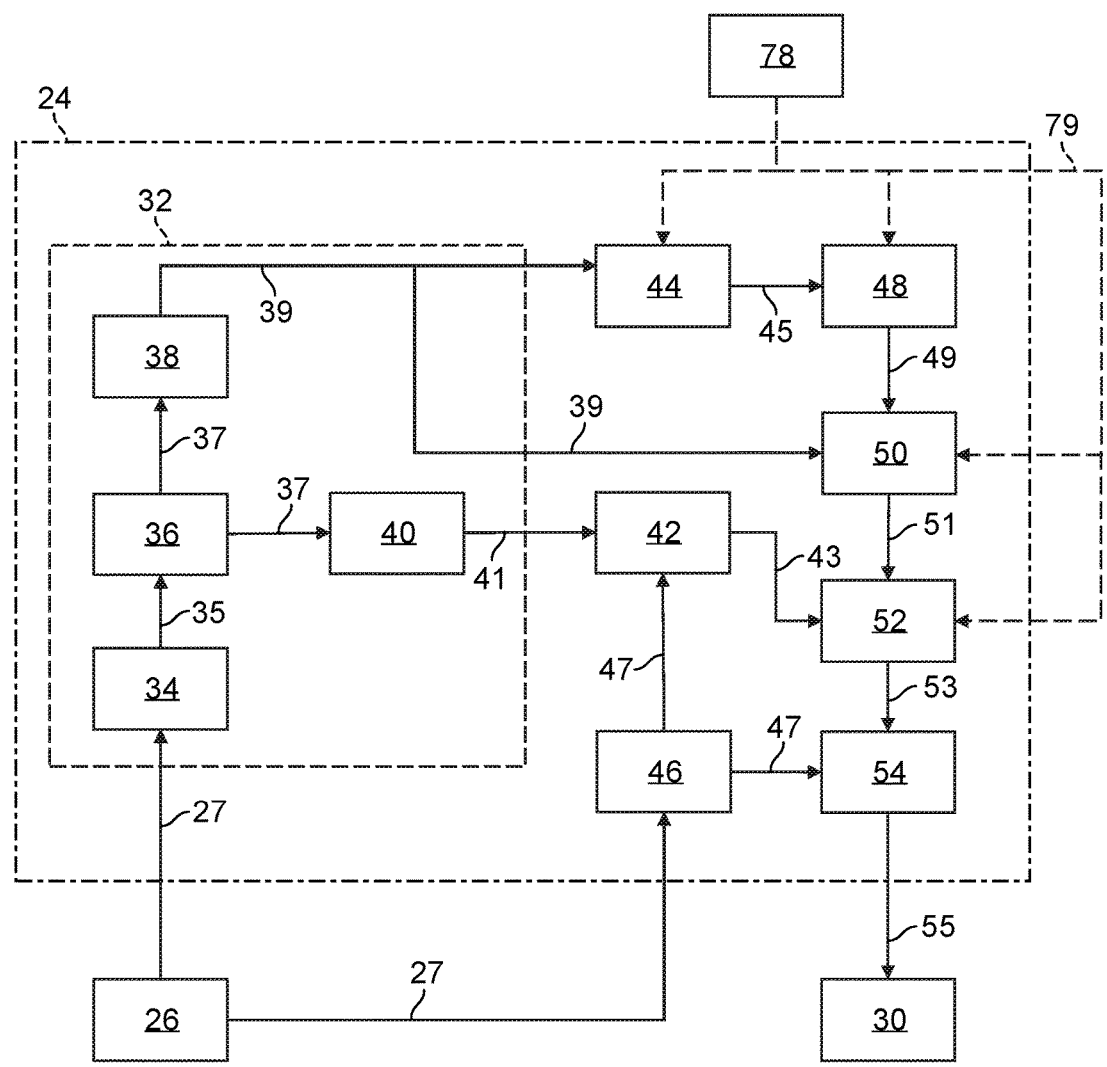
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

While the exemplary embodiment of FIG. 2 illustrates a Level Four or Level Five automated driving system, other embodiments according to the present disclosure may include Level Two or Level Three automated driving systems. Such automated driving systems may have system architectures other than as illustrated in FIG. 2.

Under some operating conditions, output from actuators 30 may not satisfy the vehicle control output 55. Some such operating conditions are transient, e.g. as a result of external steering torque influences such as a bump in a road surface. If diagnostic conditions are present, a recurring difference between the vehicle control output 55 and output from one or more actuators 30. While the actuators 30 may be configured to self-report diagnostic conditions, some such diagnostic conditions may be difficult to detect based on data from the actuators 30.

Figure 3:
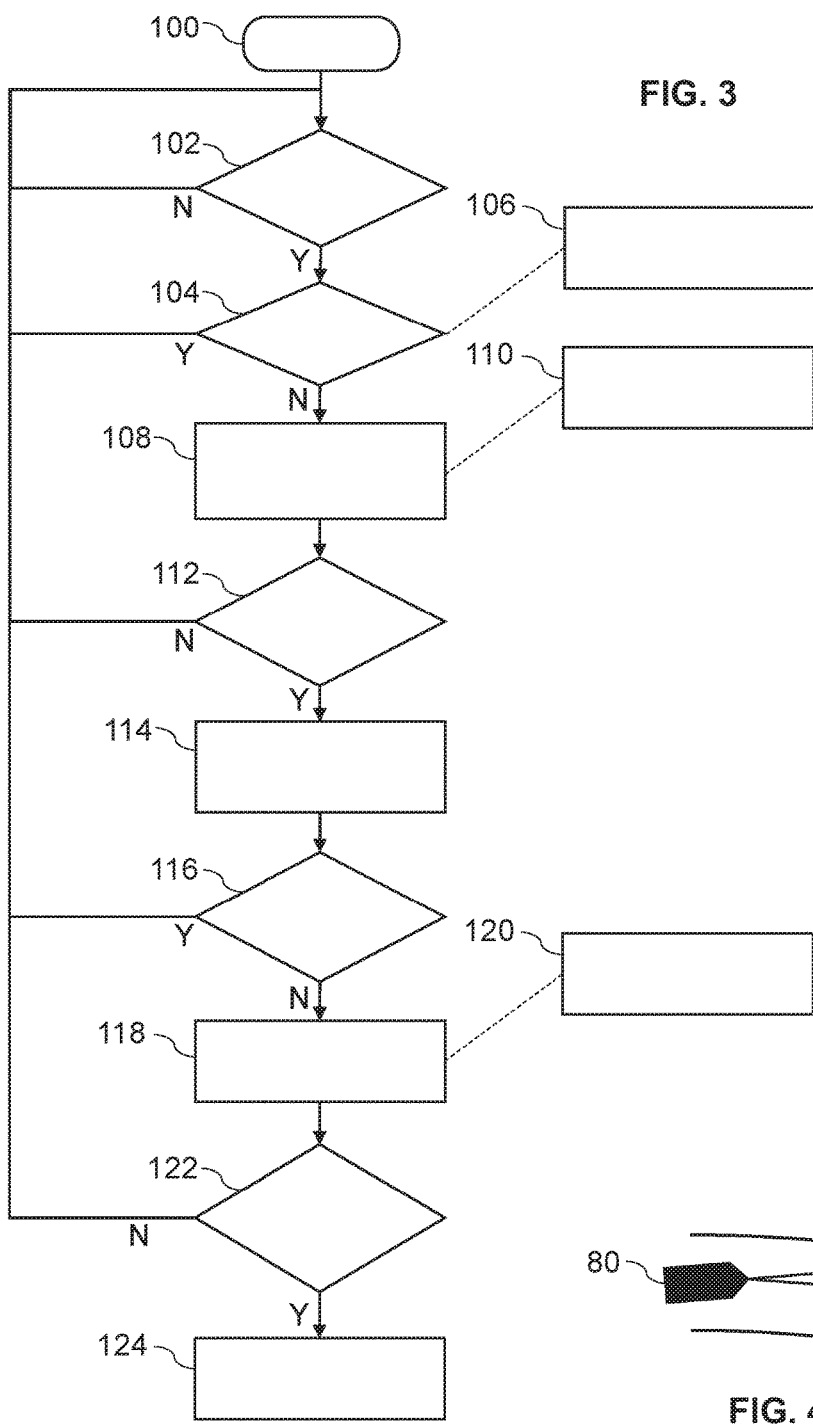
FIG. 3 is a flowchart representation of a method of controlling a vehicle according to an embodiment of the present disclosure.

Referring to FIG. 3, a method for compensating for a deviation between vehicle control output and actual actuator output is illustrated in flowchart form. The method begins at block 100.

A determination is made of whether the vehicle is under the control of an automated driving system, i.e. is operating in an autonomous mode, as illustrated at operation 102. If the determination of operation 102 is negative, control remains at operation 102. Thus, the algorithm does not proceed unless and until the vehicle is under the control of an automated driving system. If the determination of operation 102 is positive, control proceeds to operation 104.

A determination is then made of whether the steering system is under the influence an external torque, as illustrated at operation 104. An external influence includes torques such as those resulting from a discontinuity or pothole in a road surface, or from an operator's manual operation of a control interface such as a steering wheel, as illustrated at block 106. External torque influences may be detected by, for example vehicle torsion sensors. If the determination of operation 104 is positive, control returns to operation 102. Thus, the algorithm does not proceed when the steering system is under the influence of an external torque. If the determination of operation 104 is negative, control proceeds to block 108.

An actuator command limit for maintaining a target path curvature is calculated, as illustrated at block 108. The target path curvature refers to a curvature in a target path to be followed, based on the path planning output 51. The command may be based on factors including the curvature of the target path and current vehicle speed, as illustrated at block 110.

A determination is made of whether a current actuator command is above the calculated limit, as illustrated at operation 112. If the determination of operation 112 is negative, control returns to operation 102. Thus, the algorithm does not proceed unless the current actuator command exceeds the calculated actuator command limit. If the determination of operation 112 is positive, control proceeds to block 114.

A heading difference is calculated, as illustrated at block 114. The heading difference refers to a difference between the current vehicle heading and the target path. The current vehicle heading may be obtained from a variety of sensors, such as LiDAR, optical camera signals, an inertial measurement unit, or compass readings.

Figure 4:
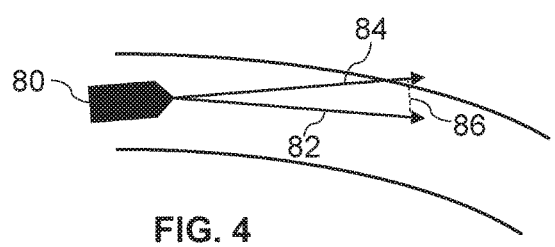
FIG. 4 is an illustration of a vehicle in a diagnostic condition.

Referring to FIG. 4, a representative vehicle 80 is illustrated for reference. The representative vehicle 80 is under control of an automated driving system. The target path for the automated driving system is along a first vector 82. The current vehicle heading is along a second vector 84, resulting in a heading difference 86.

A determination is made of whether the heading difference indicates that the actual yaw rate of the vehicle is greater than that of the target path. If the determination of operation 116 is positive, control returns to operation 102. Thus, the algorithm does not proceed if the actual yaw rate of the vehicle is greater than that of the target path. If the determination of operation 116 is negative, control proceeds to block 118.

A road wheel angle threshold is calculated, as illustrated at block 118. The road wheel angle threshold refers to the minimum angle at which the yaw rate of the target path may be satisfied if adequate road friction is present. This may be calculated based on factors including path curvature, as illustrated at block 120. Above the road wheel angle threshold, if actual yaw rate does not exceed that of the target path, one may infer that adequate road friction is not present.

A determination is then made of whether the current road wheel angle is below the road wheel angle threshold, as illustrated at operation 122. If the determination of operation 122 is negative, control returns to operation 102. Thus, the algorithm does not proceed if the heading difference may be attributed to environmental conditions such as high wind or wet roadways. If the determination of operation 122 is positive, control proceeds to block 124.

A diagnostic mode is activated, as illustrated at block 124. The diagnostic mode refers to an alternate mode of operation, distinct from a standard mode of operation under ADS control. The alternate mode of operation may include a backup control mode, such as a rear wheel steering system if available. The alternate mode of operation may include providing an operator alert, e.g. signaling the operator to take control of the vehicle. The alternate mode of operation may include a coasting mode, other diagnostic functions, or a combination of the above.

The method illustrated in FIG. 3 may be run as a diagnostic algorithm by various control modules, e.g. by the vehicle control module 54. Notably, the method illustrated in FIG. 3 may be executed as a closed-loop diagnostic in parallel with actuator control algorithms, independent of the actual output of the monitored actuator.

As may be seen, the present disclosure provides a system and method for detecting a diagnostic condition associated with an actuator and taking appropriate diagnostic action. Moreover, systems and methods according to the present disclosure do so via a software-based solution, independent of any signals received from the actuator.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle having an automated driving system configured to control vehicle steering, comprising:
   determining a commanded vehicle path;
   calculating a steering command to satisfy the commanded vehicle path;
   controlling vehicle steering, via the automated driving system, according to the steering command;
   detecting a difference between an actual vehicle path and the commanded vehicle path; and
   in response to the detected difference and in further response to a determination that no external torque influence affects vehicle steering, controlling the vehicle according to a diagnostic mode, wherein the controlling the vehicle according to the diagnostic mode is in further response to a current actuator command exceeding a calculated actuator command threshold to maintain a target path.

2. The method of claim 1, wherein the controlling the vehicle according to the diagnostic mode is in further response to a current road wheel angle being below a calculated road wheel angle threshold.

3. The method of claim 1, wherein the diagnostic mode includes a secondary steering mode.

4. The method of claim 1, wherein the diagnostic mode includes providing an operator notification.

5. A vehicle comprising:
   an actuator configured to control vehicle steering; and
   at least one controller programmed to control the actuator according to an automated driving system, the at least one controller being programmed to determine a target path, calculate an actuator setting to satisfy the target path, control the actuator according to the actuator setting, detect a difference between an actual vehicle path and the target path, and in response to the detected difference and in further response to a determination that no external torque influence affects vehicle steering, control the actuator according to a diagnostic mode;
   wherein the controller is configured to control the actuator according to the diagnostic mode in further response to a current actuator command exceeding a calculated actuator command threshold to maintain a target path.

6. The vehicle of claim 5, wherein the controller is configured to control the actuator according to the diagnostic mode in further response to a current road wheel angle being below a calculated road wheel angle threshold.

7. The vehicle of claim 5, wherein the diagnostic mode includes a secondary steering mode.

8. The vehicle of claim 5, wherein the diagnostic mode includes providing an operator notification.

\* \* \* \* \*